United States Patent
Hsia et al.

(10) Patent No.: US 9,583,970 B2
(45) Date of Patent: Feb. 28, 2017

(54) WIRELESS POWER TRANSFER AND RAPID CHARGING SYSTEM AND METHOD WITH MAXIMUM POWER TRACKING

(71) Applicant: NATIONAL YUNLIN UNIVERSITY OF SCIENCE AND TECHNOLOGY, Yunlin County (TW)

(72) Inventors: Shih-Chang Hsia, Yunlin County (TW); Jhen-Wun Fan, Yunlin County (TW)

(73) Assignee: National Yunlin University of Science and Technology, Yulin County (TW)

( * ) Notice: Subject to any disclaimer, the term of this patent is extended or adjusted under 35 U.S.C. 154(b) by 166 days.

(21) Appl. No.: 14/713,161

(22) Filed: May 15, 2015

(65) Prior Publication Data
US 2016/0336783 A1    Nov. 17, 2016

(51) Int. Cl.
*H02J 7/02*  (2016.01)
*H02J 5/00*  (2016.01)
*H02J 7/00*  (2006.01)

(52) U.S. Cl.
CPC .............. *H02J 7/025* (2013.01); *H02J 5/005* (2013.01); *H02J 7/007* (2013.01)

(58) Field of Classification Search
CPC ............. H02J 7/025; H02J 7/007; H02J 5/005
USPC .......................................... 307/26, 104, 140
See application file for complete search history.

(56) References Cited

U.S. PATENT DOCUMENTS

| | | | | |
|---|---|---|---|---|
| 9,157,337 | B2* | 10/2015 | Arisawa | F01K 25/00 |
| 2012/0280575 | A1* | 11/2012 | Kim | H02J 17/00 307/104 |
| 2015/0188358 | A1* | 7/2015 | Jeong | H02J 5/005 320/108 |
| 2016/0079766 | A1* | 3/2016 | Jeong | H02J 7/0013 307/104 |
| 2016/0079792 | A1* | 3/2016 | Jeong | H02J 7/025 455/573 |
| 2016/0164316 | A1* | 6/2016 | Shizuno | B60L 11/18 320/157 |

\* cited by examiner

*Primary Examiner* — Jared Fureman
*Assistant Examiner* — Michael Warmflash
(74) *Attorney, Agent, or Firm* — Rosenberg, Klein & Lee

(57) ABSTRACT

A wireless power transfer and rapid charging system with maximum power tracking and a method for the same are revealed. The system includes a transmitter device and a receiver device. First the transmitter device performs maximum power tracking and outputs a fixed resonant frequency. Now the receiver device charges a battery. A voltage detection circuit of the receiver device is detecting charging state of the battery. A high-frequency receiving circuit of the transmitter device checks whether a high-frequency transmission circuit transmits a fully-charged signal. When the high-frequency receiving circuit of the transmitter device receives the fully-charged signal that represents the battery is fully charged, the transmitter device shuts down the power and enters standby mode. Thereby wireless charging can be carried out in different environments. The greater transfer distances, lower output impedance, and higher wireless transmission efficiency can be achieved. The speed of wireless charging is also increased.

17 Claims, 10 Drawing Sheets

WIRELESS POWER TRANSFER AND RAPID CHARGING SYSTEM AND METHOD WITH MAXIMUM POWER TRACKING

BACKGROUND OF THE INVENTION

Field of the Invention

The present invention relates to a wireless power transfer and charging system and a method for the same, especially to a wireless power transfer and rapid charging system with maximum power tracking and a method for the same that carry out wireless charging in different environments. An optimal transfer frequency is found, the system provides longer transmission distance, reduced output impedance, greater wireless transmission efficiency, and higher speed of wireless charging.

Descriptions of Related Art

Wireless charging is also called inductive charging or non-contact inductive charging. Energy is transferred from a charger to a device by near-field induction (inductive coupling). The device uses the energy received for its own operation and charging of the battery. No physical wire connection is required between the charger and the device. Thus there is no contact metal exposed outside for the charger and the device. This is more convenient in use.

The wireless charging is based on electromagnetic induction. Generally a wireless charger includes a coil that creates an alternating electromagnetic field after being driven by alternating current while another coil in a device takes power from the electromagnetic field and converts it back into electrical current. The electrical current is used for charging the battery and supplying power to the device.

However, the wireless charging system with the expected functions also has shortcoming in practice such as limited transmission range, poor transmission efficiency, limited wireless environment, etc.

Thus there is room for improvement and a need to provide a wireless power transfer and rapid charging system and a method for the same that overcomes the shortcomings of conventional wireless charging devices.

SUMMARY OF THE INVENTION

Therefore it is a primary object of the present invention to provide a wireless power transfer and rapid charging system with maximum power tracking and a method for the same that perform wireless charging in different environments. The transmission distance is increased, the output impedance is reduced and the wireless transmission efficiency is dramatically improved. At the same time, the speed of wireless charging is increased.

In order to achieve the above object, a wireless power transfer and rapid charging system with maximum power tracking of the present invention includes a transmitter device and a receiver device. The transmitter device is mainly disposed with a high-frequency receiving circuit. The high-frequency receiving circuit is used for receiving inductive energy of the receiver device and is connected to a decoder. The decoder is for decoding the inductive energy of the receiver device and is connected to a digital controller. The digital controller is connected to a memory and a digital-to-analogue converter (DAC). The digital controller and the DAC are connected to a voltage-controlled oscillator (VCO) for providing different input voltages for the VCO 15 requires. The VCO is connected to an anti-overlapping circuit. The VCO uses a constant-current inverting oscillator for generating scanning frequency. The scanning frequency is output by the anti-overlapping circuit. The anti-overlapping circuit is connected to a phase-1 buffer circuit and a phase-2 buffer circuit. The phase-1 buffer circuit is connected to a first power transistor (such as Power MOS1) while the phase-2 buffer circuit is connected to a second power transistor (such as Power MOS2). The output from the anti-overlapping circuit is passed through the phase-1 buffer circuit and the phase-2 buffer circuit to provide sufficient drive capability for driving the first power transistor and the second power transistor respectively. The first power transistor and the second power transistor are both connected to a coil for creating a magnetic field while the coil is connected to a RLC resonant circuit for output.

The receiver device mainly includes a RLC resonant circuit corresponding to the RLC resonant circuit of the transmitter device. The RLC resonant circuit is connected to a half-wave-rectifier circuit while the half-wave-rectifier circuit is connected to a voltage regulator unit. A voltage sensing & high-frequency signal transmitting circuit is arranged between and connected to the half-wave-rectifier circuit and the voltage regulator unit. The voltage regulator unit is connected to the charging circuit and the voltage sensing & high-frequency signal transmitting circuit is also connected to the charging circuit. The voltage sensing & high-frequency signal transmitting circuit is arranged with a voltage detection circuit and an input end of the voltage detection circuit is connected to a switch. The voltage detection circuit is also connected to a quantizer. The quantizer is further connected to a controller while the controller is connected to a high-frequency transmission circuit. Thus the voltage detected by the voltage detection circuit is transmitted to the high-frequency receiving circuit of the transmitter device by the high-frequency transmission circuit. The charging circuit is set with a constant current circuit while the constant current circuit is connected to a power transistor. The power transistor is connected to a battery by a change over switch for charging the battery while the battery is connected to a load.

The purpose and function of a method for wireless power transfer and rapid charging with maximum power tracking of the present invention are achieved by the following techniques. The wireless power transfer and rapid charging system with maximum power tracking includes the transmitter device and the receiver device. The control and operation of the system includes following three modes.

A. maximum power tracking mode: optimal resonant frequency of the system is automatically searched to generate maximum wireless power transfer.

B. battery fast charging mode: the receiver device receives the maximum power transfer and then chargers the battery rapidly according to current time function.

C. standby mode: the digital controller of the transmitter device controls the VCO through the DAC to stop oscillation so that there is no magnetic field created.

After the power of the transmitter device being turned on, maximum power scanning and tracking is carried out first. Then a fixed resonant frequency of the maximum power is output after the tracking. Now the charging circuit of the receiver device charges the battery and the charging state of the battery is detected by the voltage detection circuit of the voltage sensing & high-frequency signal transmitting circuit of the of the receiver device. The high-frequency receiving circuit of the transmitter device checks whether the high-frequency transmission circuit of the voltage sensing & high-frequency signal transmitting circuit transmits a fully-charged signal. When the high-frequency receiving circuit of the transmitter device receives the fully-charged signal that represents the battery is fully charged, the transmitter device shuts down the power and enters the standby mode.

While the transmitter device performing maximum power scanning and tracking, the digital controller generates a digital code for control of output voltage of the DAC. Then the voltage is input into the VCO (Voltage Control Oscillator) for generating a scanning frequency. After the frequency passed through the phase-1 buffer circuit and the phase-2 buffer circuit, a driving current for wireless power transfer is provided for driving the first power transistor and the second power transistor and the coil connected to the first and the second power transistors creates a magnetic field. Then the RLC resonant circuit provides high-efficiency wireless power transfer. After receiving the magnetic-field signal, the RLC resonant circuit of the receiver device converts the signal to electric energy that is sensed by the voltage detection circuit of the voltage sensing & high-frequency signal transmitting circuit. Next the high-frequency transmission circuit of the voltage sensing & high-frequency signal transmitting circuit transmits the sensed power level at the frequency used now to the high-frequency receiving circuit of the transmitter device. The frequency and the level are recorded by the memory of the transmitter device connected to the digital controller. Then the digital controller generates another digital code for controlling oscillation frequency of the VCO. According to the above steps, the transmitter device receives a sensed level at the frequency again. If the level is stronger than the data stored, the level and frequency of the stronger signal got now is stored. After tracking for a period of time according to the steps, the frequency and the level of the maximum power transfer can be found out and stored.

During the maximum power tracking, to fasten search speed, the frequency band is divided into a coarse-level frequency band and a fine-level frequency band. The scanning frequency ranges from hundreds of KHz to dozens of KHz. First perform coarse-level frequency band scanning. The frequency band is divided into a number of M parts. Start scanning from the highest frequency sub-band and then continue scanning by using lower frequency sub-bands in turn. The frequency point and the value of the maximum level are recorded in a register built-in the digital controller of the transmitter device. The coarse-level frequency scanning is complete after scanning of the lowest frequency sub-band. Thus the maximum power point in the coarse-level frequency band is found out. According to the optimal frequency point obtained at the coarse-level scanning, perform fine-level frequency band scanning by using the frequency at each of two ends of the optimal frequency band. Then control finest scanning frequency of the VCO and record frequency point at the maximum level and the value of the maximum level in the register. After the end of fine-level frequency scanning, the frequency point stored in the register is the optimal resonant frequency point during maximum power tracking.

While searching the maximum voltage, data is transmitted from the receiver device to the transmitter device. The receiver device transmits a start code, a data code and an end code in turn. The end code represents the end of data transmission. The data is sent to the digital controller after the transmitter device receiving the data. The digital controller starts receiving the data code after receiving the start code. The data is established when at least two pieces of data among the three pieces of data received are the same. The end code is received after the data code and this represents receiving of the data is complete. During maximum power tracking, the data code received is the digital voltage value the receiver device sensed. After being received, each piece of data is compared with the voltage value received previous time. If the voltage value received this time is larger than the voltage value received previous time, the previous data is replaced by the data received this time.

The receiver device includes two switches for mode control. In the maximum power tracking mode, the switch between the half-wave-rectifier circuit and the voltage regulator unit is conducting. In the charging mode, the switch is off while the change over switch is switched to be connected to the battery for charging. During maximum power scanning, the voltage varies at different frequency. A low resistance at the input end is used as a load and the voltage being tracked now is converted to a digital code to be transmitted to the high-frequency receiving circuit of the transmitter device by the high-frequency transmission circuit. After receiving the voltage value detected now, the receiver device transmits a new frequency and the same way is used to keep tracking. After completing the tracking, the maximum resonant frequency point is found out. At the moment, the charging circuit is switched to the charging mode and the battery is charged.

For charging control, the quantizer of the voltage sensing & high-frequency signal transmitting circuit sends an analogue voltage value to the controller. A start code is sent first and a digital code is transmitted for a number of N times. Then an end code is sent to inform the receiver device the data transmission is complete. Next check whether the analogue voltage value is changed or not. Once the voltage value is not changed for a period of time, the maximum power has been reached and the charging circuit automatically enters the charging mode. Whether the battery is fully charged or not is continuingly checked during charging of the battery. When the battery is fully charged, the voltage sensing & high-frequency signal transmitting circuit transmits a set of signals to the transmitter device for informing completion of charging. The transmitter device automatically turns off the power and enters the standby mode once receiving the signals.

The charging circuit further includes a voltage controller, a time controller, a controller and a current output controller. The voltage controller and the time controller are connected to the controller while the controller is connected to the current output controller. Whether the battery is charged is checked by the controller and the charging current is selected according to the voltage checked. Initially, pre-charging the battery, when the battery voltage is smaller than V1, use I1 as the charging current in t1 minutes. If the battery voltage is larger than V1, the charging current I1 charges the battery in t2 minutes, and then is switched to I2, where the charging time t1>t2. As the charging current I2 charges the battery, when the battery voltage is increased to V2, the charge time is t2, else t1 used, and then the charging current is switched to I3. When the battery is charged to a full capacity if the charging voltage arrived at V3, use the time controller. The current is gradually decreased from I3 to I2 after a period of time and further decreased from I2 to I1 after a period of time. Next the charging is complete after a further period of time. I3>I2>I1 and V3>V2>V1.

The voltage controller is an inverter while the charging circuit detecting the voltage. The voltage is adjusted by various ratio of p-transistor to n-transistor. Three switching points are found out and input into the controller. The detected voltage is $V_f$ and $V_f = V_{CC} - V_b - V_{battery}$. As the battery voltage $V_{battery}$ is larger, the detected voltage $V_f$ becomes smaller. According to the detected voltage, the controller controls the current drive unit to generate various current for charging the battery.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
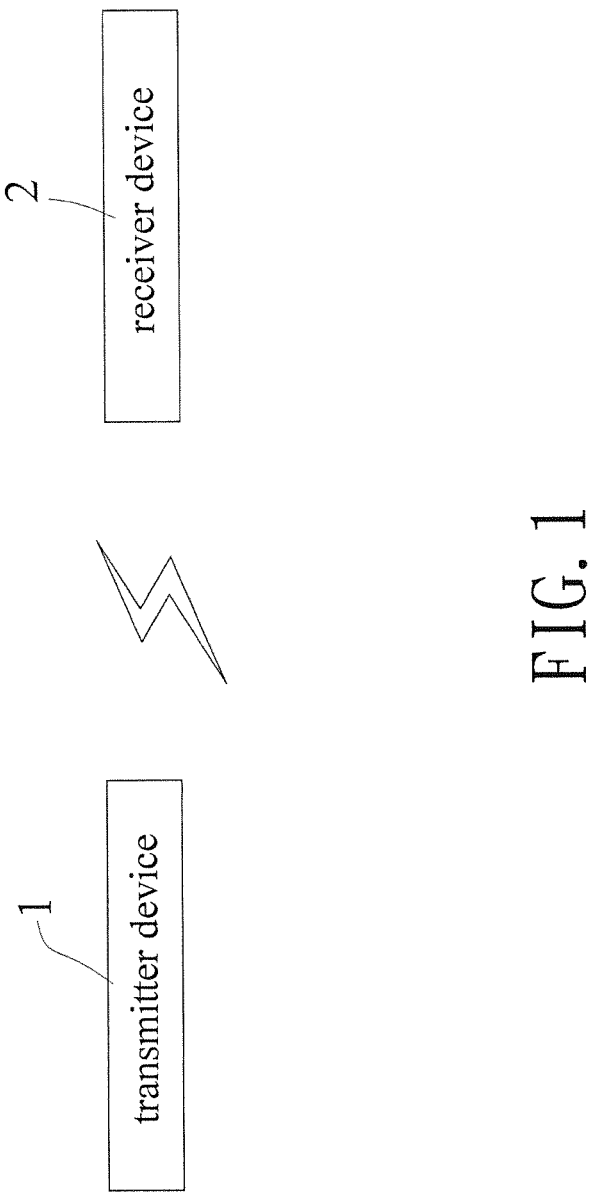
FIG. 1 is a schematic drawing showing a structure of an embodiment according to the present invention.

Refer to FIG. 1, the present invention mainly includes a transmitter device 1 and a receiver device 2.

Figure 2:
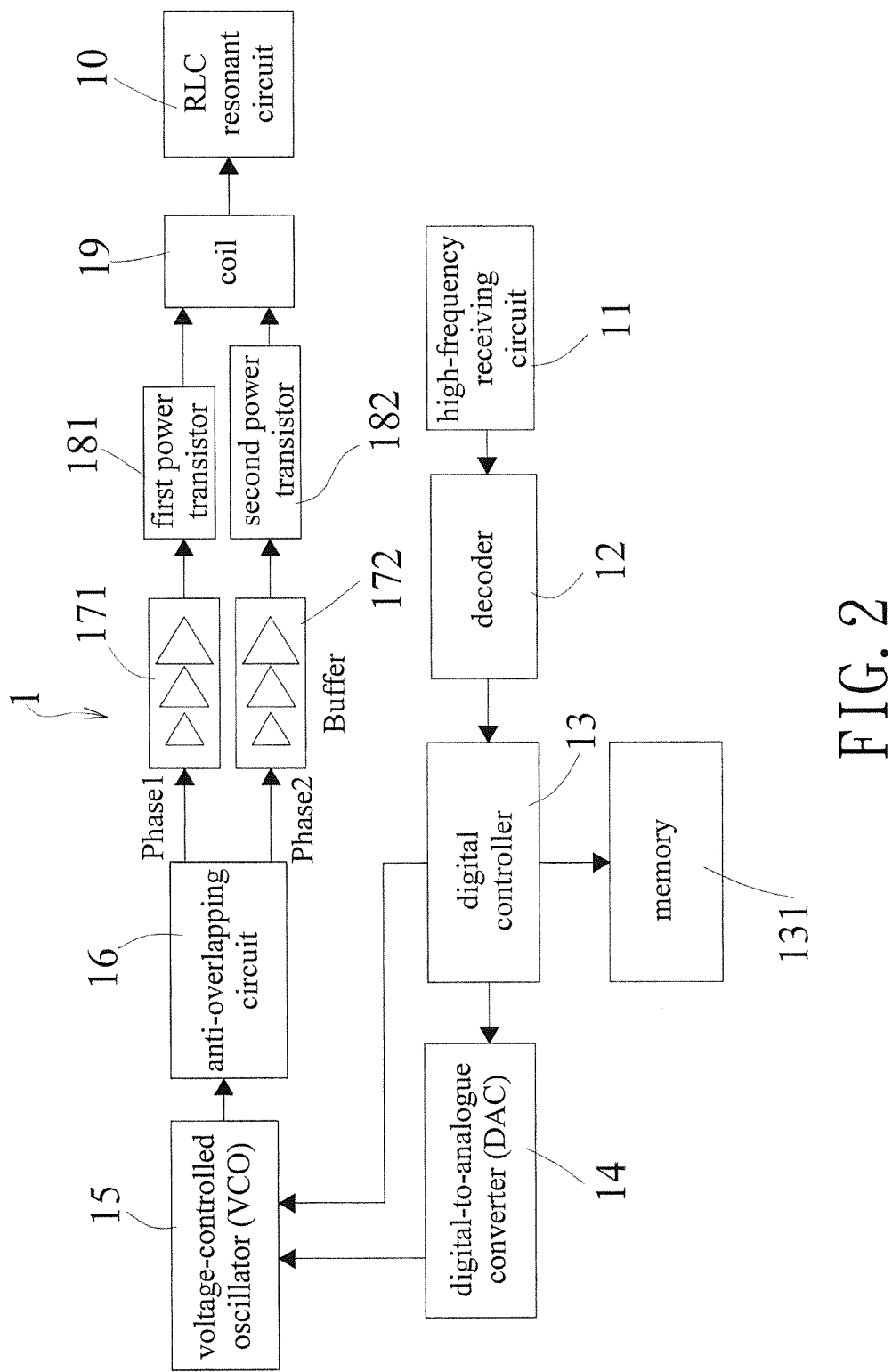
FIG. 2 is a block diagram of a transmitter device of an embodiment according to the present invention.

Refer to FIG. 2, a block diagram showing circuit structure of the transmitter device 1 is revealed. The transmitter device 1 consists of a high-frequency receiving circuit 11, a decoder 12, a digital controller 13, a digital-to-analogue converter (DAC) 14, a voltage-controlled oscillator (VCO) 15, an anti-overlapping circuit 16, a phase-1 buffer circuit 171, a phase-2 buffer circuit 172, a first power transistor 181, a second power transistor 182, a coil 19 and a RLC resonant circuit 10. The high-frequency receiving circuit 11 is for receiving inductive energy of the receiver device 2 and is connected to the decoder 12. The decoder 12 is for decoding the inductive energy of the receiver device 2 and is connected to the digital controller 13. The digital controller 13 is connected to both a memory 131 and the DAC 14. Both the digital controller 13 and the DAC 14 are connected to the VCO 15 for providing different voltages to the VCO 15 for maximum power point tracking. The frequency output from the VCO 15 is determined by the voltage input. The VCO 15 is connected to the anti-overlapping circuit 16. The VCO uses a constant-current inverting oscillator for generating scanning frequency and outputs Ho and Lo signals. The phase difference between the two waveforms Ho, Lo is 180 degrees while the negative half cycle of the waveform and the positive half cycle of the waveform are complementary to each other. The signals are output through the anti-overlapping circuit 16. The anti-overlapping circuit 16 is connected to the phase-1 buffer circuit 171 and the phase-2 buffer circuit 172. The phase-1 buffer circuit 171 is connected to the first power transistor 181 (such as Power MOS1) while the phase-2 buffer circuit 172 is connected to the second power transistor 182 (such as Power MOS2). The waveforms in which the positive half cycle and the negative half cycle are complementary output by the anti-overlapping circuit 16 are passed through the phase-1 buffer circuit 171 and the phase-2 buffer circuit 172 respectively to generate enough drive ability for driving the first power transistor 181 and the second power transistor 182 respectively. Thus the first power transistor 181 and the second power transistor 182 are protected from short-circuit while both in a conductive state. The circuit burnout and power consumption are further avoided. The first power transistor 181 and the second power transistor 182 are both connected to the coil 19 for creating a magnetic field while the coil 19 is connected to the RLC resonant circuit 10 for output. The RLC resonant circuit 10 is a RLC series/parallel resonant circuit.

Figure 3:
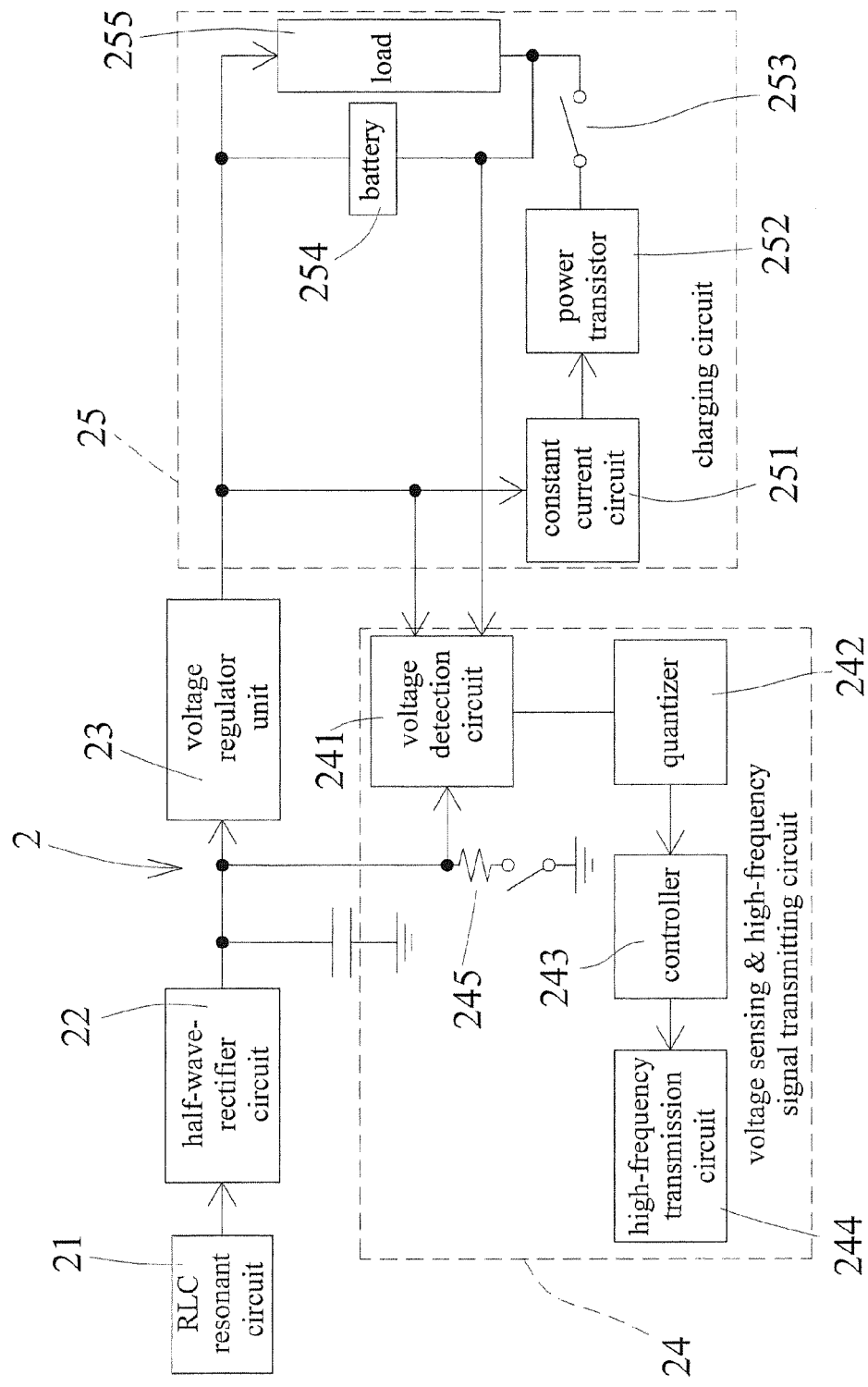
FIG. 3 is a block diagram of a receiver device of an embodiment according to the present invention.

Refer to FIG. 3, the receiver device 2 includes a RLC resonant circuit 21, a half-wave-rectifier circuit 22, a voltage regulator unit 23, a voltage sensing & high-frequency signal transmitting circuit 24, and a charging circuit 25. The RLC resonant circuit 21 of the receiver device 2 is corresponding to the RLC resonant circuit 10 of the transmitter device 1 and is connected to the half-wave-rectifier circuit 22 while the half-wave-rectifier circuit 22 is connected to the voltage regulator unit 23. The voltage sensing & high-frequency signal transmitting circuit 24 is arranged between and connected to the half-wave-rectifier circuit 22 and the voltage regulator unit 23. The voltage regulator unit 23 is connected to the charging circuit 25 and the voltage sensing & high-frequency signal transmitting circuit 24 is also connected to the charging circuit 25. The RLC resonant circuit 21 receives the energy while detecting the energy transferred from the RLC resonant circuit 10 of the transmitter device 1. Then the half-wave-rectifier circuit 22 and the voltage regulator unit 23 convert the voltage to DC (direct current) voltage used for the voltage sensing & high-frequency signal transmitting circuit 24 and the charging circuit 25. The voltage sensing & high-frequency signal transmitting circuit 24 is used for maximum power tracking and having a voltage detection circuit 241, a quantizer 242, a controller 243, a high-frequency transmission circuit 244 and a switch 245. An input end of the voltage detection circuit 241 is connected to the switch 245 and the voltage detection circuit 241 is also connected to the quantizer 242. The quantizer 242 is further connected to the controller 243 while the controller 243 is connected to the high-frequency transmission circuit 244. Thus the voltage detected by the voltage detection circuit 241 is transmitted to the high-frequency receiving circuit 11 of the transmitter device 1 by the high-frequency transmission circuit 244. The charging circuit 25 is arranged with a constant current circuit 251 while the constant current circuit 251 is connected to a power transistor 252. The power transistor 252 is connected to a battery 254 by a change over switch 253 for charging the battery 254 while the battery 254 is connected to a load 255. The battery 254 can provide power to the load 255. While the battery 254 is fully charged, the fully charged state is detected by the voltage sensing & high-frequency signal transmitting circuit 24 and then sent from the high-frequency transmission circuit 244 to the high-frequency receiving circuit 11 of the transmitter device 1. Thus the transmitter device 1 turns off the power of the VCO 15.

The control and operation of the present invention includes following three modes:

A. maximum power tracking mode: optimal resonant frequency of the system is automatically searched to generate maximum wireless power transfer, wherein the switch 245 turns on; the switch 243 turns off.

B. battery fast charging mode: the receiver device 2 receives the maximum wireless power transfer and then chargers the battery 254 rapidly according to current time function, where in the switch 245 turns off; the switch 243 turns on.

C. standby mode: the digital controller 13 controls a voltage-controlled oscillator (VCO) 15 through the DAC 14 to stop oscillation so that there is no magnetic field present, where in the switch 245 turns off; the switch 243 turns off.

Figure 4:
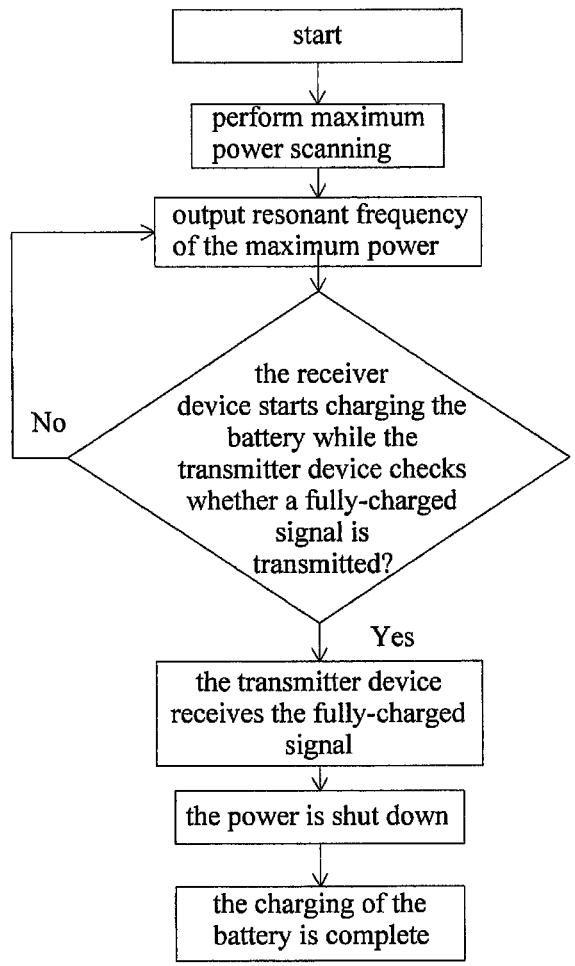
FIG. 4 is a flow chart showing the control steps of an embodiment according to the present invention.

Refer to FIG. 4, a flow chart showing the control steps of the present invention is revealed. After the power of the transmitter device 1 being turned on, maximum power scanning and tracking is carried out first. Then a fixed resonant frequency of the maximum power is output after the tracking. Now the charging circuit 25 of the receiver device 2 starts charging the battery 254 while the voltage detection circuit 241 of the voltage sensing & high-frequency signal transmitting circuit 24 of the receiver device 2 is detecting the charging state of the battery 254. The high-frequency receiving circuit 11 of the transmitter device 1 checks whether the high-frequency transmission circuit 244 of the voltage sensing & high-frequency signal transmitting circuit 24 transmits a fully-charged signal. When the high-frequency receiving circuit 11 of the transmitter device 1 receives the fully-charged signal that represents the battery 254 is fully charged, the transmitter device 1 shuts down the power and enters the standby mode.

When the transmitter device 1 performs maximum power scanning and tracking, the digital controller 13 generates digital codes for control of output voltage of the DAC 14. Then the voltage is input into the VCO 15 for generating a scanning frequency. After the scanning frequency passed through the phase-1 buffer circuit 171 and the phase-2 buffer circuit 172, a driving current is provided for driving the first power transistor 181 and the second power transistor 182. At the same time, the coil 19 connected to the first power transistor 181 and the second power transistor 182 creates a magnetic field. Then the RLC resonant circuit 10 provides high-efficiency wireless power transfer. After receiving the magnetic-field signal, the RLC resonant circuit 21 of the receiver device 2 converts the signal into electric energy which is sensed by the voltage detection circuit 241 of the voltage sensing & high-frequency signal transmitting circuit 24. Then the high-frequency transmission circuit 244 of the voltage sensing & high-frequency signal transmitting circuit 24 transmits the sensed power level at the frequency used now to the high-frequency receiving circuit 11 of the transmitter device 1. The memory 131 of the transmitter device 1 connected to the digital controller 13 records the frequency and the level. Next the digital controller 13 generates another digital code for controlling oscillation frequency of the VCO 15. According to the steps mentioned above, the transmitter device 1 received the sensed level at the frequency again. If the level is stronger than the data recorded and stored, the level and frequency of the stronger signal got now is stored. After tracking for a period of time according to these steps, the frequency and the level of the maximum power transfer can be found out and stored.

Figure 5:
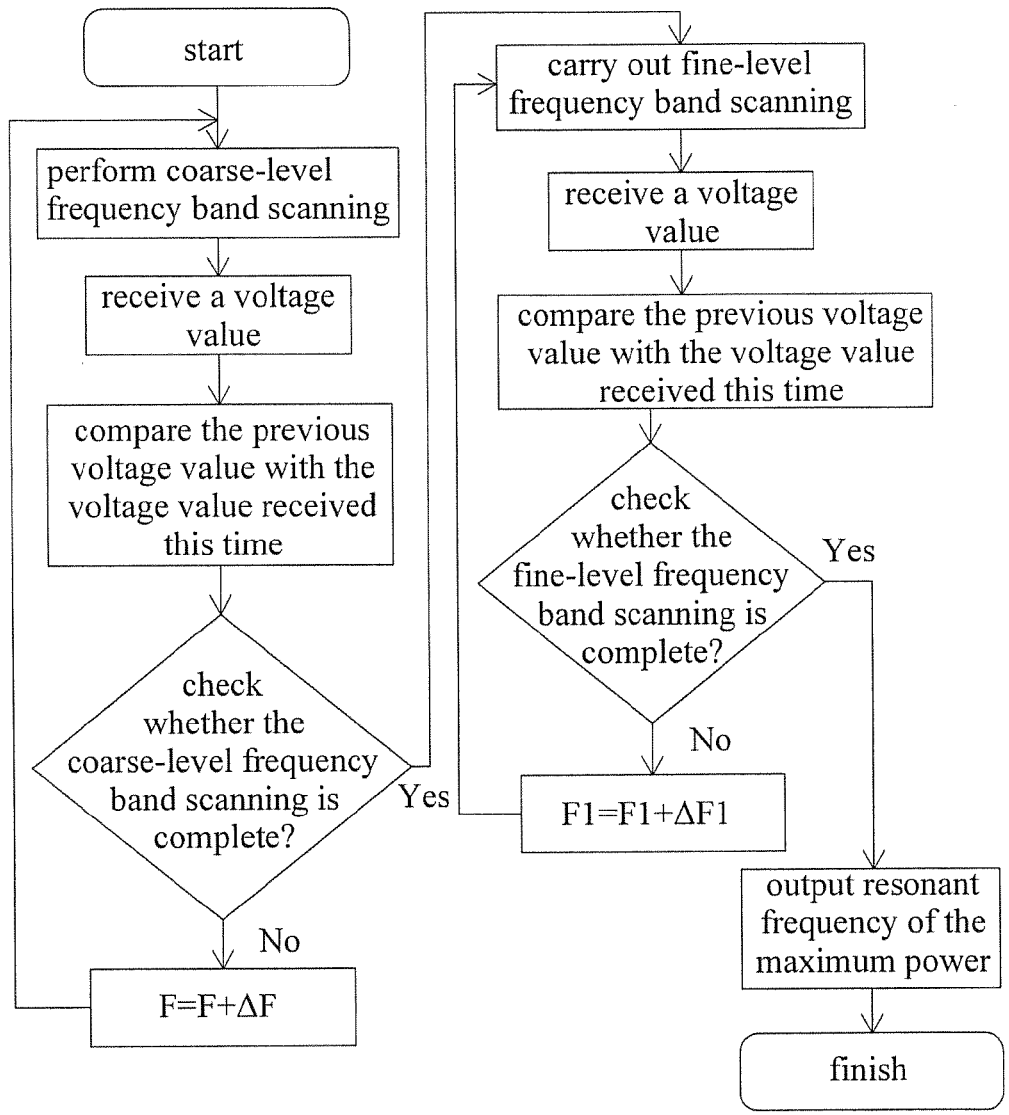
FIG. 5 is a flow chart showing steps for searching optimal frequency for maximum power tracking of an embodiment according to the present invention.

Refer to FIG. 5, while performing the maximum power tracking, the frequency band is divided into a coarse-level frequency band and a fine-level frequency band. The scanning frequency ranges from hundreds of KHz to dozens of KHz. First perform coarse-level frequency band scanning. The frequency band is divided into several (a number of M) parts. Start scanning from the highest frequency sub-band and then continue scanning by using lower frequency sub-bands in turn. The frequency point and the value of the maximum level are recorded in a register built-in the digital controller 13 of the transmitter device 1. The coarse-level frequency scanning is complete after scanning of the lowest frequency sub-band. Thus the maximum power point in the coarse-level frequency band is found out. According to the optimal frequency point obtained at the coarse-level scanning, perform fine-level frequency band scanning by using the frequency at each of two ends of the optimal frequency band. Then control the finest scanning frequency of the VCO 15, and record a frequency point and a value of the maximum level in the register. After completion of fine-level frequency scanning, the frequency point stored in the register is the optimal resonant frequency point during maximum power tracking.

Figure 6:
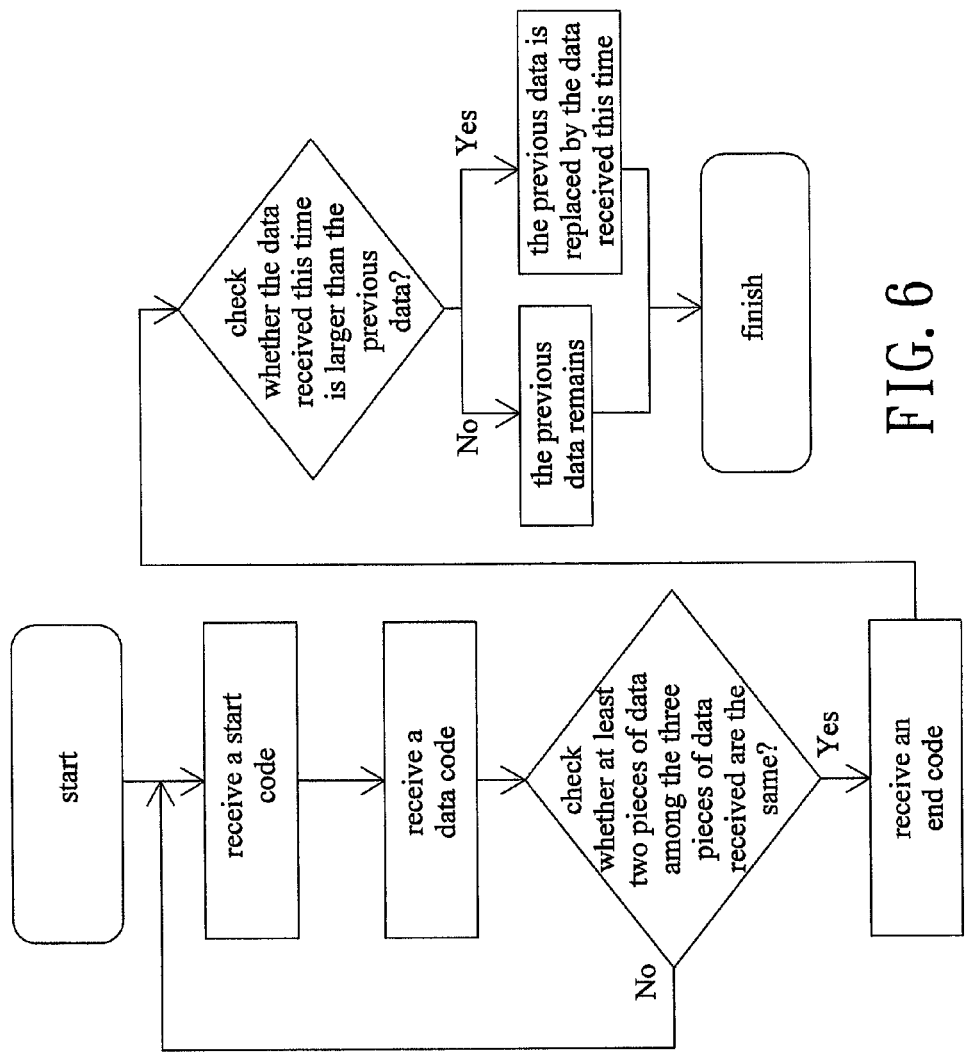
FIG. 6 is a flow chart showing steps for data communication of an embodiment according to the present invention.

Refer to FIG. 6, a flow chart showing steps for searching maximum voltage is revealed. Data is transmitted from the receiver device 2 to the transmitter device 1 while searching the maximum voltage. The receiver device 2 first transmits a start code and then a data code for data transmission. After completing data code transmission, an end code that represents the end of data transmission is sent. The data is sent to the digital controller 13 after the transmitter device 1 receiving the data. The digital controller 13 starts receiving the data code after receiving the start code. The data is established when at least two pieces of data among the three pieces of data received are the same. The end code is received after the data code and this represents receiving of the data is complete. During maximum power tracking, the data code received is the digital voltage value the receiver device 2 sensed. After being received, each piece of data is compared with the voltage value received previous time. If the voltage value received this time is larger than the voltage value received previous time, the previous data is replaced by the data received this time.

Moreover, the receiver device 2 includes two switches for control of the modes. In the maximum power tracking mode, the switch 245 between the half-wave-rectifier circuit 22 and the voltage regulator unit 23 is conducting. During maximum power scanning, the voltage varies at different frequency. A low resistor at the input end is used as a load and the voltage being tracked now is converted to a digital code that is transmitted to the high-frequency receiving circuit 11 of the transmitter device 1 by the high-frequency transmission circuit 244. After receiving the voltage value detected now, the receiver device 2 transmits a new frequency and the same way is used to keep tracking. After completing the tracking, the maximum resonant frequency point is found out. In the charging mode, the switch 245 is turned off while the change over switch 253 is switched to be connected to the battery 254 for charging. At the moment, the charging circuit 25 is switched to the charging mode and the battery 254 is charged, as well as supporting load 255 power.

Figure 7:
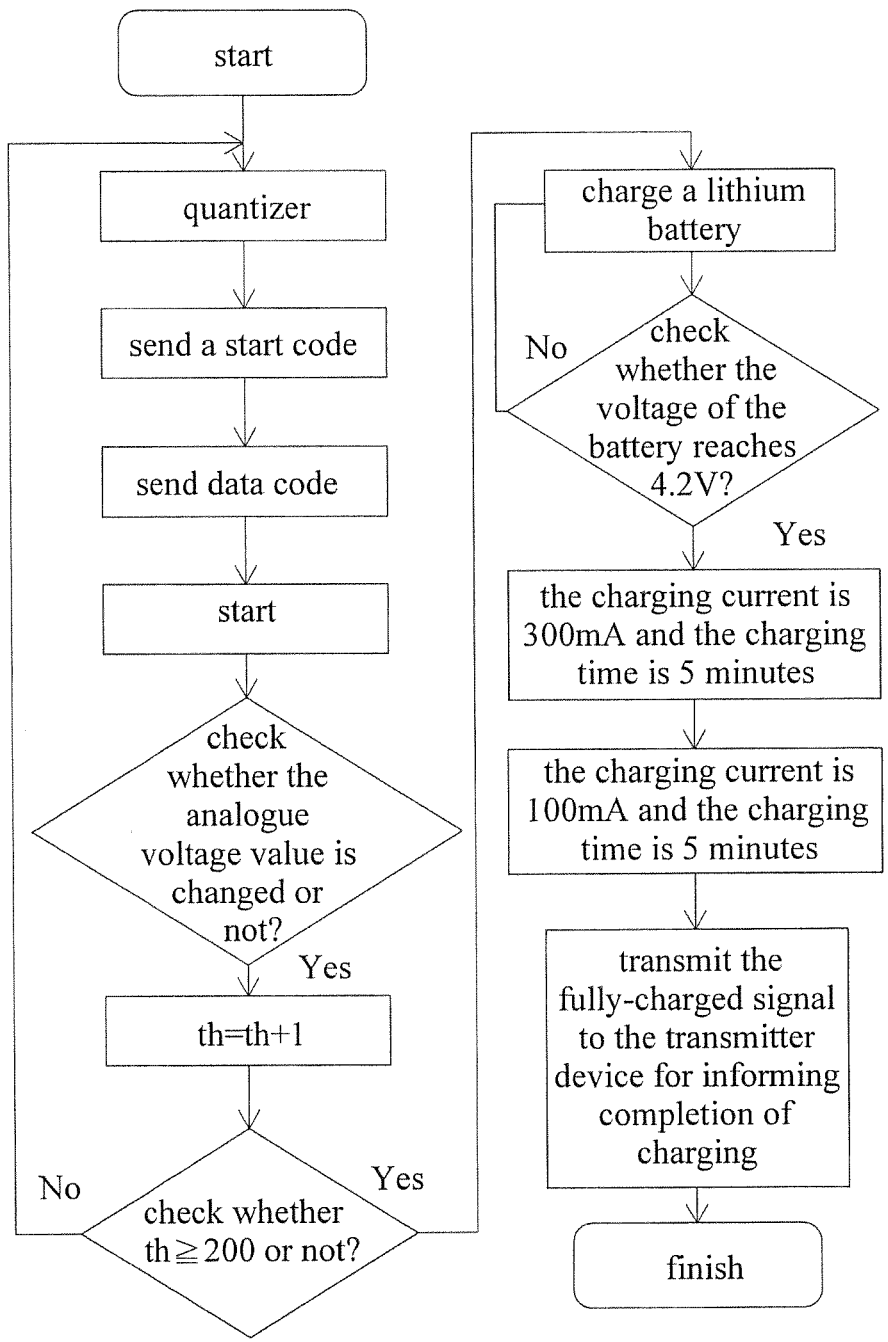
FIG. 7 is a flow chart showing steps for charging control of an embodiment according to the present invention.

Refer to FIG. 7, a flow chart showing steps for charging control is revealed. For charging control, the quantizer 242 of the voltage sensing & high-frequency signal transmitting circuit 24 sends an analogue voltage value to the controller 243. A start code is sent first and a digital code is transmitted for a number of N times. Then an end code is sent to inform the receiver device the transmission of the data is complete. Next check whether the analogue voltage value is changed or not. Once the voltage value is not changed for a period of time, the maximum power has been reached and the charging circuit 25 automatically enters the charging mode.

During charging of the battery 254, whether the battery 254 is fully charged or not is continuingly checked. When the battery 254 is fully charged, the voltage sensing & high-frequency signal transmitting circuit 24 transmits a set of signals to the transmitter device 1 for informing completion of charging. The transmitter device 1 automatically turns off the power and enters the standby mode once receiving the signals.

Figure 8:
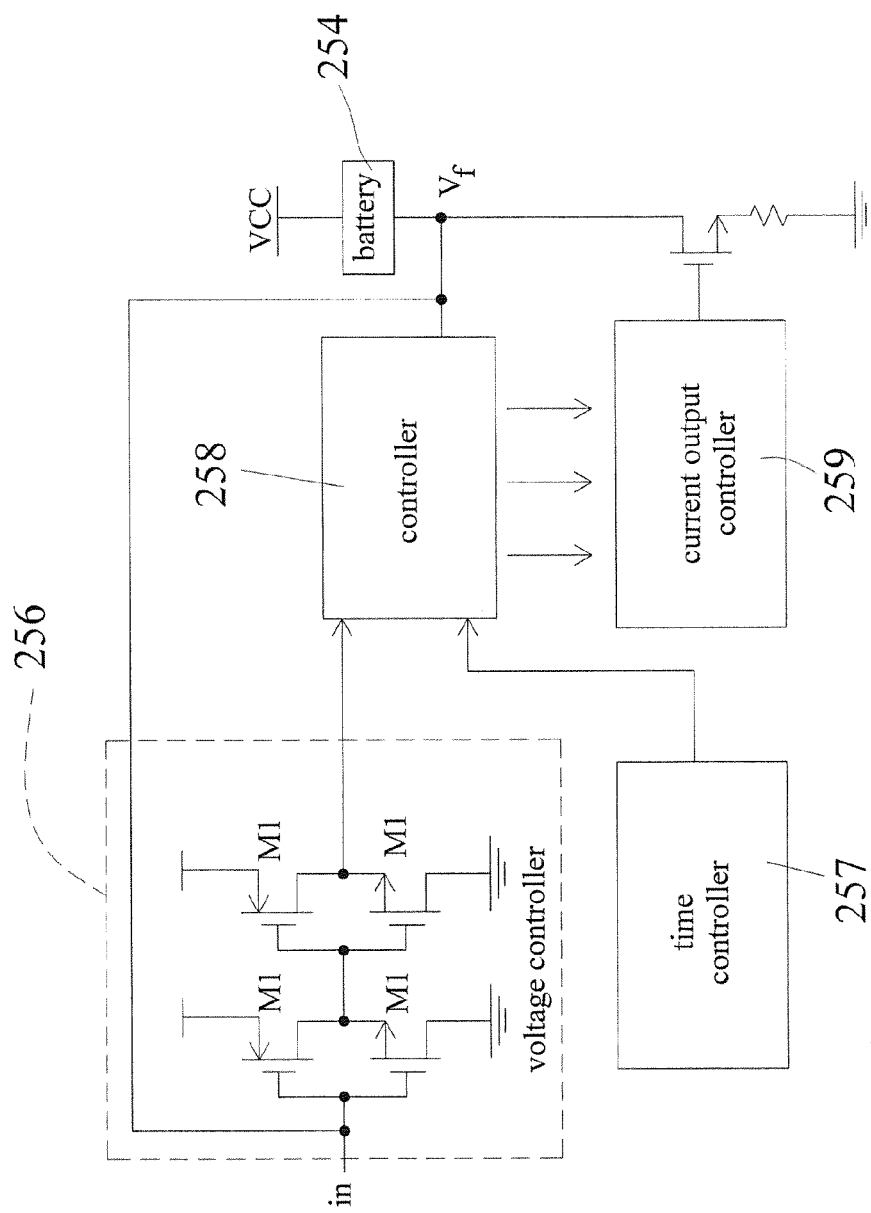
FIG. 8 is a schematic drawing showing charging circuit architecture of an embodiment according to the present invention.

Refer to FIG. 8, a schematic drawing showing charging circuit architecture is revealed. The charging circuit 25 further includes a voltage controller 256, a time controller 257, a controller 258 and a current output controller 259. The voltage controller 256 and the time controller 257 are connected to the controller 258 while the controller 258 is further connected to the current output controller 259. The controller 258 is used to check whether the battery is charged and the current for charging is selected according to the voltage checked.

The fast charge used time-current function. When the battery voltage is smaller than V1, use I1 as the charging current in t1 minutes. If the battery voltage is larger than V1, the charging current I1 charges the battery in t2 minutes, and then is switched to I2, where the charging time t1>t2. As the charging current I2 charges the battery, when the voltage of the battery 254 is increased to V2, the charge time is t2, else t1 used, and then the charging current is switched to I3. When the voltage of battery 254 is charged to V3 that is a full capacity, then use the time controller 257. The current is gradually decreased from I3 to I2 after a period of time and further decreased from I2 to I1 after a period of time. Next the charging is complete after a further period of time. I3>I2>I1 and V3>V2>V1.

Figure 9:
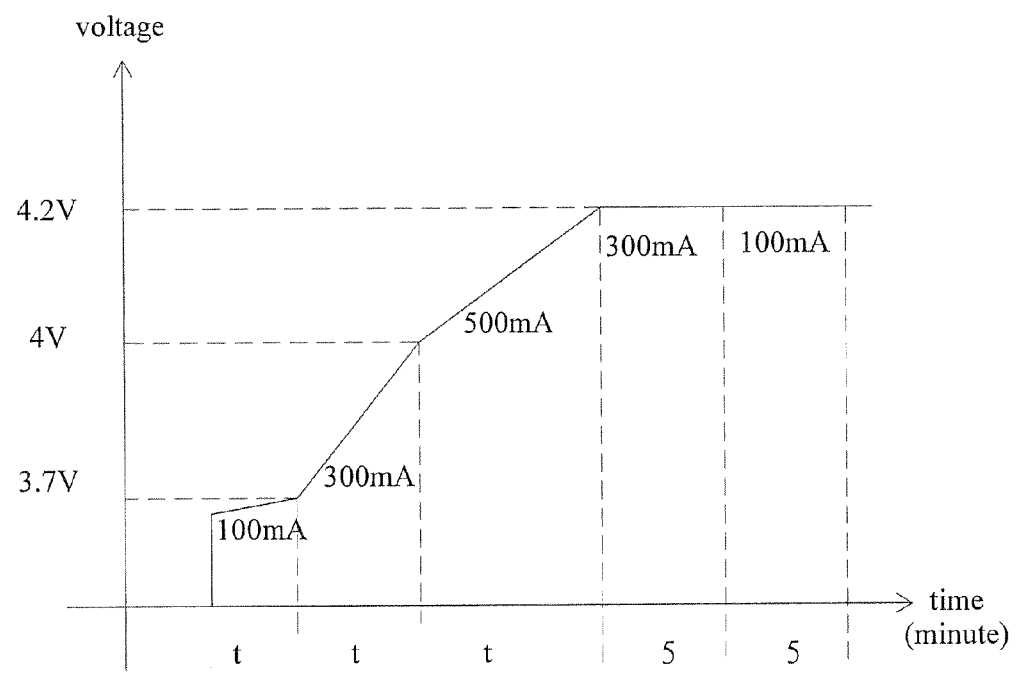
FIG. 9 is a charging curve of a 4.2 V lithium battery being charged by an embodiment according to the present invention.

Refer to FIG. 9, a charging curve showing a 4.2 V Lithium battery 254 being charged by the present invention is revealed. When the voltage of the chargeable battery 254 is smaller than 3.7 V, the charging current is 100 mA in 10-20 minutes, else the charging time is changed to several minutes, and then the charging current is switched to 300 mA. The charging current is 300 mA in 1020 minutes when the voltage of the chargeable battery 254 is less than 4V; the charging time is shortened to several minutes if larger than 4V; and then the charging current is switched to 500 mA. The charging current is 500 mA when the voltage of the chargeable battery 254 is checked whether equal to 4.2V. The current is decreased into 300 mA when the voltage of the chargeable battery 254 is 4.2V and the charging time is 5 minutes. The charging is complete after the charging current is further decreased to 100 mA for 5 minutes. Then the charging current is cut off to zero.

Figure 10:
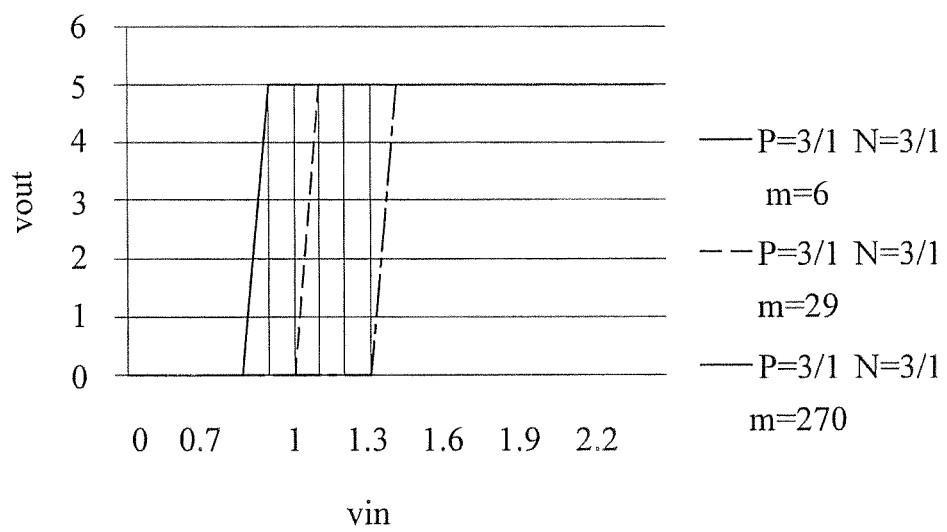
FIG. 10 is a curve showing voltage switching points detected by an inverter of an embodiment according to the present invention.

In the charging circuit 25, the voltage controller 256 can be an inverter while detecting the voltage. The voltage is adjusted by various ratio of p-transistor to n-transistor. Refer to FIG. 10, a curve showing voltage switching points detected by the inverter is revealed. Three switching points are found out and input into the controller 258. The detected voltage is $V_f$ and $V_f = V_{CC} - V_{battery}$. The larger the battery voltage $V_{battery}$ is, the smaller the detected voltage $V_f$ is. According to the detected voltage, the controller 258 controls the current drive unit to generate various current for charging the battery 254.

In summary, compared with the charging system and method available now, the present invention can be applied in different environments. The transmission distance is increased, the output impedance is reduced and the wireless transmission efficiency is dramatically improved. At the same time, the speed of wireless charging is increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A wireless power transfer and rapid charging system with maximum power tracking comprising
   a transmitter device and
   a receiver device;
   wherein the transmitter device includes a high-frequency receiving circuit, a decoder, a digital controller, a digital-to-analogue converter (DAC), a voltage-controlled oscillator (VCO), an anti-overlapping circuit, a phase-1 buffer circuit, a phase-2 buffer circuit, a first power transistor, a second power transistor, a coil and a RLC resonant circuit; the high-frequency receiving circuit is used for receiving inductive energy of the receiver device and is connected to the decoder; the decoder used for decoding inductive energy of the receiver device is connected to the digital controller; the digital controller is connected to a memory and the DAC while the digital controller and the DAC are connected to the VCO for providing different input voltages the VCO requires; the VCO is connected to the anti-overlapping circuit and using a constant-current inverting oscillator for generating scanning frequency; the anti-overlapping circuit is connected to the phase-1 buffer circuit and the phase-2 buffer circuit while the phase-1 buffer circuit is connected to the first power transistor and the phase-2 buffer circuit is connected to the second power transistor; output from the anti-overlapping circuit is passed through the phase-1 buffer circuit and the phase-2 buffer circuit to provide sufficient drive capability for driving the first power transistor and the second power transistor respectively so that the coil connected to the first power transistor and the second power transistor creates a magnetic field to be output by the RLC resonant circuit connected to the coil;
   wherein the receiver device includes a RLC resonant circuit, a half-wave-rectifier circuit, a voltage regulator unit, a voltage sensing & high-frequency signal transmitting circuit, and a charging circuit; the RLC resonant circuit is corresponding to the RLC resonant circuit of the transmitter device and is connected to the half-wave-rectifier circuit while the rectifier circuit is connected to the voltage regulator unit; the voltage sensing & high-frequency signal transmitting circuit is arranged between and connected to the half-wave-rectifier circuit and the voltage regulator unit; the voltage regulator unit is connected to the charging circuit while the charging circuit is connected to the voltage sensing & high-frequency signal transmitting circuit;
   the voltage sensing & high-frequency signal transmitting circuit having a voltage detection circuit, a quantizer, a controller, a high-frequency transmission circuit and a switch; an input end of the voltage detection circuit is connected to the switch and the voltage detection circuit is connected to the quantizer while the quantizer is further connected to the controller; the controller is connected to the high-frequency transmission circuit; thus voltage detected by the voltage detection circuit is transmitted to the high-frequency receiving circuit of the transmitter device by the high-frequency transmission circuit;
   the charging circuit includes a constant current circuit, a power transistor, a change over switch, a battery and a load; the constant current circuit is connected to the power transistor and the power transistor is connected to the battery by the change over switch for charging the battery; the battery is connected to the load and used for providing power to the load.

2. The system as claimed in claim 1, wherein when the transmitter device performs the maximum power tracking, the digital controller generates a digital code for control of output voltage of the DAC and then the output voltage is input into the VCO for generating a scanning frequency; the frequency is passed through the phase-1 buffer circuit and the phase-2 buffer circuit to provide a driving current that drives the first power transistor and the second power transistor; the coil connected to the first and the second power transistors creates a magnetic field and then the RLC resonant circuit provides high-efficiency wireless power transfer; after receiving a magnetic-field signal, the RLC resonant circuit of the receiver device converts the magnetic-field signal to electric energy that is sensed by the voltage detection circuit of the voltage sensing & high-frequency signal transmitting circuit; the high-frequency transmission circuit of the voltage sensing & high-frequency signal transmitting circuit transmits a level of the sensed electric energy at a frequency used now to the high-frequency receiving circuit of the transmitter device; the frequency and the level are recorded by the memory connected to the digital controller; then the digital controller generates another digital code for controlling oscillation frequency of the VCO; the transmitter device receives another level sensed at another frequency again; if the another level sensed at another frequency is stronger than the level recorded in the memory, the another level sensed and the another frequency sensed are recorded to replace the level and the frequency recorded previously; a further frequency and a further level of maximum power transfer are found out and recorded after tracking for a period of time.

3. The system as claimed in claim 1, wherein a frequency band is divided into a coarse-level frequency band and a fine-level frequency band during the maximum power tracking and the frequency band used for scanning ranges from hundreds of KHz to dozens of KHz; first scanning is carried out by using the coarse-level frequency band and the coarse-level frequency band is divided into a number of M parts; start scanning from the highest frequency sub-band of the coarse-level frequency band and then continue scanning by using lower frequency sub-bands of the coarse-level frequency band in turn; a frequency point and a value of the maximum level are recorded in a register built-in the digital controller of the transmitter device; the coarse-level frequency scanning is complete after scanning of the lowest frequency sub-band of the coarse-level frequency band; the maximum level in the coarse-level frequency band is found out and the frequency point is used for scanning of the fine-level frequency band; control the finest scanning frequency of the VCO and record a frequency point and a value of the maximum level in the register; after the scanning of the fine-level frequency band being complete, the frequency point stored in the register is optimal resonant frequency point during maximum power tracking.

4. The system as claimed in claim 1, wherein data is transmitted from the receiver device to the transmitter device for searching the maximum voltage; the receiver device transmits a start code, a data code and an end code in turn; the end code represents that data transmission is complete; the data is sent to the digital controller after the transmitter device receiving the data; the digital controller starts receiving the data code after receiving the start code; the data is established when at least two pieces of data among the three pieces of data received are the same; the end code is received after the data code and this represents receiving of the data is complete; during maximum power tracking, the data code received is a digital voltage value the receiver device sensed; each piece of data is compared with the voltage value received previous time after being received; once the voltage value received this time is larger than the voltage value received previous time, the voltage value received previous time is replaced by the voltage value received this time.

5. The system as claimed in claim 1, wherein the receiver device includes two switches for mode control; in a maximum power tracking mode, the switch between the half-wave-rectifier circuit and the voltage regulator unit is conducting; in a charging mode, the switch is off and the change over switch is switched to be connected to the battery for charging; the voltage varies at different frequency during maximum power tracking; a low resistance at the input end is used as a load and the voltage being tracked now is converted to a digital code to be transmitted to the high-frequency receiving circuit of the transmitter device by the high-frequency transmission circuit; the receiver device receives the digital code of the voltage and then transmits a new frequency; thereby the maximum resonant frequency point is found out and the charging circuit is switched to a charging mode and the battery is charged.

6. The system as claimed in claim 1, wherein the quantizer of the voltage sensing & high-frequency signal transmitting circuit sends an analogue voltage value to the controller for charging control; a start code is sent first and a digital code is transmitted for a number of N times; then an end code is sent to inform the receiver de vice transmission is complete; next whether the analogue voltage value is changed or not is checked; once the voltage value is not changed for a period of time, the maximum power has been reached and the charging circuit automatically enters a charging mode; whether the battery is fully charged or not is continuingly checked during charging of the battery; the voltage sensing & high-frequency signal transmitting circuit transmits a set of signals to the transmitter device for informing completion of charging when the battery is fully charged; thereby the transmitter device automatically turns power down and enters a standby mode.

7. The system as claimed in claim 1, wherein the charging circuit further includes a voltage controller, a time controller, a controller and a current output controller; the voltage controller and the time controller are connected to the controller while the controller is connected to the current output controller; whether the battery is charged is checked by the controller and charging current is selected according to checking of a voltage of the battery; when the voltage of the battery is smaller than V1, use I1 as the charging current during t1 time, else the charging time is shortened to t2 time, and then the charge current is switched to I2; if the voltage of the battery is larger than V2, the charging current is I2 during t2 time, else using t1 time, and then the charging current is switched to I3. When the battery voltage is increased to V3; the time controller is used wherein the battery is charged fully; the charging current is gradually decreased from I3 to I2 after a period of time and further decreased from I2 to I1 after a period of time; then the charging is complete after a further period of time; wherein I3>I2>I1 and V3>V2>V1, t1>t2.

8. The system as claimed in claim 1, wherein the voltage controller is an inverter while the charging circuit performs voltage detecting; the inverter adjust voltage by various ratio of p-transistor to n-transistor and three switching points are found out and input into the controller; voltage detected is $V_f$ and $V_f=V_{CC}-V_{battery}$; the larger the battery voltage $V_{battery}$ is, the smaller the detected voltage $V_f$ is; according to the voltage detected, the controller controls a current drive unit to generate various currents for charging the battery.

9. The system as claimed in claim 1, wherein the transmitter device performs maximum power tracking after a power thereof being turned on; then a fixed resonant frequency of the maximum power is output after the maximum power tracking and now the charging circuit of the receiver device charges a battery and charging state of the battery is detected by the voltage detection circuit of the voltage sensing & high-frequency signal transmitting circuit of the receiver device; the high-frequency receiving circuit of the transmitter device checks whether the high-frequency transmission circuit of the voltage sensing & high-frequency signal transmitting circuit transmits a fully-charged signal; when the high-frequency receiving circuit of the transmitter device receives the fully-charged signal that represents the battery is fully charged, the transmitter device shuts down the power and enters a standby mode.

10. The system as claimed in claim 9, wherein when the transmitter device performs the maximum power tracking, the digital controller generates a digital code for control of output voltage of the DAC and then the output voltage is input into the VCO for generating a scanning frequency; the frequency is passed through the phase-1 buffer circuit and the phase-2 buffer circuit to provide a driving current that drives the first power transistor and the second power transistor; the coil connected to the first and the second power transistors creates a magnetic field and then the RLC resonant circuit provides high-efficiency wireless power transfer; after receiving a magnetic-field signal, the RLC resonant circuit of the receiver device converts the magnetic-field signal to electric energy that is sensed by the voltage detection circuit of the voltage sensing & high-frequency signal transmitting circuit; the high-frequency transmission circuit of the voltage sensing & high-frequency signal transmitting circuit transmits a level of the sensed electric energy at a frequency used now to the high-frequency receiving circuit of the transmitter device; the frequency and the level are recorded by the memory connected to the digital controller; then the digital controller generates another digital code for controlling oscillation frequency of the VCO; the transmitter device receives another level sensed at another frequency again; if the another level sensed at another frequency is stronger than the level recorded in the memory, the another level sensed and the another frequency sensed are recorded to replace the level and the frequency recorded previously; a further frequency and a further level of maximum power transfer are found out and recorded after tracking for a period of time.

11. The system as claimed in claim 9, wherein a frequency band is divided into a coarse-level frequency band and a fine-level frequency band during the maximum power tracking and the frequency band used for scanning ranges from hundreds of KHz to dozens of KHz; first scanning is carried out by using the coarse-level frequency band and the coarse-level frequency band is divided into a number of M parts; start scanning from the highest frequency sub-band of the coarse-level frequency band and then continue scanning by using lower frequency sub-bands of the coarse-level frequency band in turn; a frequency point and a value of the maximum level are recorded in a register built-in the digital controller of the transmitter device; the coarse-level frequency scanning is complete after scanning of the lowest frequency sub-band of the coarse-level frequency band; the maximum level in the coarse-level frequency band is found out and the frequency point is used for scanning of the fine-level frequency band; control the finest scanning frequency of the VCO and record a frequency point and a value of the maximum level in the register; after the scanning of the fine-level frequency band being complete, the frequency point stored in the register is optimal resonant frequency point during maximum power tracking.

12. The system as claimed in claim 9, wherein data is transmitted from the receiver device to the transmitter device for searching the maximum voltage; the receiver device transmits a start code, a data code and an end code in turn; the end code represents that data transmission is complete; the data is sent to the digital controller after the transmitter device receiving the data; the digital controller starts receiving the data code after receiving the start code; the data is established when at least two pieces of data among the three pieces of data received are the same; the end code is received after the data code and this represents receiving of the data is complete; during maximum power tracking, the data code received is a digital voltage value the receiver device sensed; each piece of data is compared with the voltage value received previous time after being received; once the voltage value received this time is larger than the voltage value received previous time, the voltage value received previous time is replaced by the voltage value received this time.

13. The system as claimed in claim 9, wherein the receiver device includes the two switches for mode control; in a maximum power tracking mode, the switch between the half-wave-rectifier circuit and the voltage regulator unit is conducting; in a charging mode, the switch is off and the change over switch is switched to be connected to the battery for charging; the voltage varies at different frequency during maximum power tracking; a low resistance at the input end is used as a load and the voltage being tracked now is converted to a digital code to be transmitted to the high-frequency receiving circuit of the transmitter device by the high-frequency transmission circuit; the receiver device receives the digital code of the voltage and then transmits a new frequency; thereby the maximum resonant frequency point is found out and the charging circuit is switched to a charging mode and the battery is charged.

14. The system as claimed in claim 9, wherein the quantizer of the voltage sensing & high-frequency signal transmitting circuit sends an analogue voltage value to the controller for charging control; a start code is sent first and a digital code is transmitted for a number of N times; then an end code is sent to inform the receiver device transmission is complete; next whether the analogue voltage value is changed or not is checked; once the voltage value is not changed for a period of time, the maximum power has been reached and the charging circuit automatically enters a charging mode; whether the battery is fully charged or not is continuingly checked during charging of the battery; the voltage sensing & high-frequency signal transmitting circuit transmits a set of signals to the transmitter device for informing completion of charging when the battery is fully charged; thereby the transmitter device automatically turns power off and enters a standby mode.

15. The system as claimed in claim 9, wherein the charging circuit further includes a voltage controller, a time controller, a controller and a current output controller; the voltage controller and the time controller are connected to the controller while the controller is connected to the current output controller; whether the battery is charged is checked by the controller and charging current is selected according to checking of a voltage of the battery; when the voltage of the battery is smaller than V1, use I1 as the charging current in t1 minutes; if the voltage of the battery is larger than V1, the charging current I1 charges the battery in t2 minutes, and then the charging current is switched to I2; As the charging current I2 charges the battery, when the voltage of the battery 254 is increased to V2, the charge time is t2, else t1 used, and then the charging current is switched to I3 when the battery voltage is increased to V3 that is a full capacity; the time controller is used when the battery is charged fully; the charging current is gradually decreased from I3 to I2 after a period of time and further decreased from I2 to I1 after a period of time; then the charging is complete after a further period of time; wherein I3>I2>I1 and V3>V2>V1, t1>t2.

16. The system as claimed in claim 9, wherein the voltage controller is an inverter while the charging circuit performs voltage detecting; the inverter adjust voltage by various ratio of p-transistor to n-transistor and three switching points are found out and input into the controller; voltage detected is $V_f$ and $V_f = V_{CC} - V_{battery}$; the larger the battery voltage $V_{battery}$ is, the smaller the detected voltage $V_f$ is; according to the voltage detected, the controller controls a current drive unit to generate various currents for charging the battery.

17. A method for wireless power transfer and rapid charging with maximum power tracking comprising the steps of:
   A. automatically searching optimal resonant frequency of a wireless power transfer and rapid charging system to generate maximum wireless power transfer by a transmitter device of the wireless power transfer and rapid charging system; this is a maximum power tracking mode;
   B. receiving the maximum wireless power transfer and charging a battery rapidly according to current time function by a receiver device of the wireless power transfer and rapid charging system; this is a battery fast charging mode; and
   C. controlling a voltage-controlled oscillator (VCO) by a digital controller through a digital-to-analogue converter (DAC) to stop oscillation so that no magnetic field is created; this is a standby mode.

\* \* \* \* \*